United States Patent [19]
Edgar

[11] Patent Number: 5,956,411
[45] Date of Patent: Sep. 21, 1999

[54] PERSONAL MULTIMEDIA SPEAKER SYSTEM

[75] Inventor: Albert Durr Edgar, Austin, Tex.

[73] Assignee: International Business Machines Corporation, Armonk, N.Y.

[21] Appl. No.: 08/832,316

[22] Filed: Mar. 26, 1997

Related U.S. Application Data

[62] Division of application No. 08/673,403, Jun. 28, 1996, Pat. No. 5,742,690, which is a continuation of application No. 08/245,519, May 18, 1994, Pat. No. 5,588,063.

[51] Int. Cl.$^6$ .................................................. H04R 3/00
[52] U.S. Cl. ............................ 381/97; 381/306; 381/333; 381/89
[58] Field of Search .................................. 381/89, 24, 25, 381/90, 97, 303, 304, 306, 333, 336

[56] References Cited

U.S. PATENT DOCUMENTS

| | | |
|---|---|---|
| 2,880,817 | 4/1959 | Burns et al. . |
| 3,739,096 | 6/1973 | Iding . |
| 4,410,761 | 10/1983 | Schickendanz . |
| 4,528,597 | 7/1985 | Klein et al. . |
| 4,760,601 | 7/1988 | Pappanikolaou . |
| 4,969,196 | 11/1990 | Nakamura . |

FOREIGN PATENT DOCUMENTS

| | | |
|---|---|---|
| 1154792 | 4/1958 | France . |
| 2 642 248 | 12/1988 | France . |
| 968490 | 2/1958 | Germany . |
| 3210639 | 10/1983 | Germany . |
| 3214226 | 10/1983 | Germany . |
| 64-889 | 1/1989 | Japan . |
| 2186430 | 8/1987 | United Kingdom . |

OTHER PUBLICATIONS

IBM Technical Disclosure Bulletin, vol. 30, No. 10, Mar. 1988.

*Primary Examiner*—Ping Lee
*Attorney, Agent, or Firm*—Jeffrey S. LaBaw

[57] ABSTRACT

This invention minimizes the space required for a speaker system for a multimedia personal computer display on a desktop. The speaker system has a very thin shape, moderate cost, very good impulse and phase response for a crisp sonic detail and good directionality for use by a single listener seated in front of the multimedia personal computer display without disturbing others nearby. Each component of the speaker system is attached to or incorporated in the right or left side of the computer display. Each component comprises a plurality of small speakers arranged in a vertical, linear array. Preferably, each plurality includes a small folded waveguide which is acoustically coupled to the rear of each of the speakers. The folded waveguide is in a unique sheet configuration and enables directional ports in a treble component and a folded variable impedance maze in a base waveguide. The speaker system provides the required shape, clarity and listener isolation needed in the personal multimedia market. A locator function is provided by the speaker system to locate the listener to enable stereo effects such as sonic holography.

16 Claims, 7 Drawing Sheets

FIG. 4A  FIG. 4B

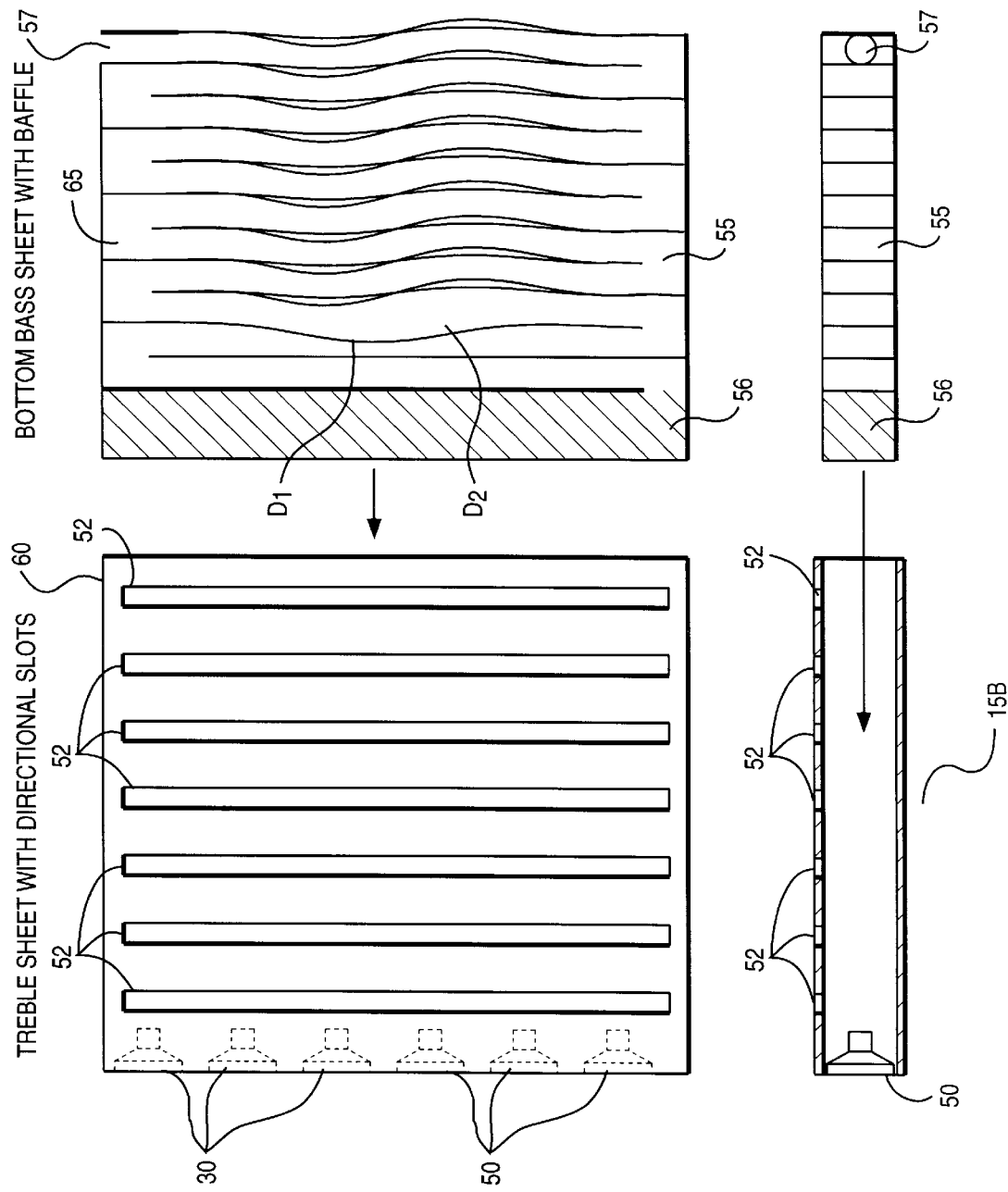
FIG. 5A SIDE VIEW
FIG. 5B TOP VIEW

PERSONAL MULTIMEDIA SPEAKER SYSTEM

This application is a divisional application of Ser. No. 08/673,403 filed Jun. 28, 1996, U.S. Pat. No. 5,742,690 which is a continuation application of Ser. No. 08/245,519 filed May 18, 1994, U.S. Pat. No. 5,588,063.

BACKGROUND OF THE INVENTION

This invention relates generally to sound reproduction on a personal computer. More particularly, it relates to a speaker system and its use for a multimedia, personal computer to deliver a high quality sound to a user sitting in close proximity to the computer display without disturbing others nearby.

High quality sound reproduction for a personal computer has not been regarded as particularly important until the advent of multimedia. While the visual images presented by the personal computers compatible with those built by the IBM Corporation have undergone a continual evolution of improvement, the typical speaker system of a personal computer is a single, inexpensive speaker buried somewhere in the system unit. To exploit the full potential of multimedia, improvements in sound quality from the personal computer are necessary.

Multimedia computing is developing into at least two distinct markets: a "group" market where good sound quality for a group of listeners positioned throughout a room is important and a "personal" market where good sound quality for a single listener sitting close to the system with minimum interference with those nearby is desired. While high quality audio systems have been extant for years and provide possible solutions for the "group" multimedia market, they are not well adapted for the requirements of a personal computer multimedia system.

In general, audio systems have been designed to deliver good quality sound throughout as wide an area as possible, i.e., the entire room, without degrading directionality of the sound. In contrast, a personal multimedia system is likely to be situated next to other like systems, each of which will be running different programs. Therefore, the sound from each personal multimedia system must be delivered as locally as possible The listeners of an audio system are apt to be scattered unpredictably throughout the room, whereas the user of a multimedia system is dependably located directly in front of the display. The required sound characteristics of personal multimedia and high quality audio for a group of listeners are different.

Further, the size and shape constraints for speakers for a multimedia personal computer display are much greater because of the premium for desk space. Speakers for a television set have more similar space and size constraints, however, they were designed to fill the needs of "group" multimedia rather than those of a single listener in close proximity to the screen.

Thus, the prior art has failed to satisfy the requirements of generating high quality sound for a multimedia personal computer display.

SUMMARY OF THE INVENTION

It is therefore an object of the invention to minimize the space required for a speaker system for a multimedia personal computer display on a desktop.

It is another object of the invention to produce sound with uniform phase characteristics.

It is another object of the invention to provide high quality sound at the user of the multimedia display without disturbing others nearby.

It is another object of the invention to minimize the cost of a multimedia speaker system which meets the above objects.

These and other objects of the invention are accomplished by a speaker system with very thin shape, moderate cost, very good impulse and phase response for crisp sonic detail and good directionality for use by a single listener seated in front of the multimedia personal computer display without disturbing others nearby. Preferably, each component of the speaker system is attached to the right or left side of the computer display. Each component comprises a plurality of small speakers arranged in a vertical linear array in a tall, deep, thin speaker cabinet. The vertical linear array is electrically driven as a phased array. In the preferred embodiment, a folded waveguide is acoustically coupled to the rear of each of the speakers. Preferably, the folded waveguide is in a unique sheet configuration which mounts flush to the sides of the display and enables directional ports in a treble component and a folded variable impedance maze in a base waveguide. The speaker system provides the required shape, clarity and listener isolation needed in the personal multimedia market.

BRIEF DESCRIPTION OF THE DRAWINGS

These and other objects and features will become more easily understood by reference with the attached drawings and following description.

FIGS. 4a and 4b are front and side views respectively of the speaker system of the present invention.

FIGS. 5a, 5b, and 5c are side, top, and three dimensional cross-sectional views respectively of the speaker system of the present invention.

DETAILED DESCRIPTION OF THE DRAWINGS

The invention can be incorporated in the display of a variety of computers. The processor unit could be for example, a personal computer, a mini computer or a mainframe computer, running the plurality of computer displays. The computer may be a standalone system, part of a network, such as a local area network or wide are network or a larger teleprocessing system. Most preferably, however, the invention as described below is implemented on a standalone multimedia personal computer, such as IBM's PS/2 multimedia series, although the specific choice of a computer is limited only by the resource requirements, e.g., memory and disk storage of multimedia programming. For additional information on IBM's PS/2 series of computer readers referred to Technical Reference Manual Personal System/2 Model 50, 60 Systems and (IBM Corporation, Part Number 68X2224, Order Number S68X-2224 and Technical Reference Manual, Personal System/2 (Model 80) IBM Corporation, Part Number 68X22256. Order Number S68X-2256.

Figure 1:
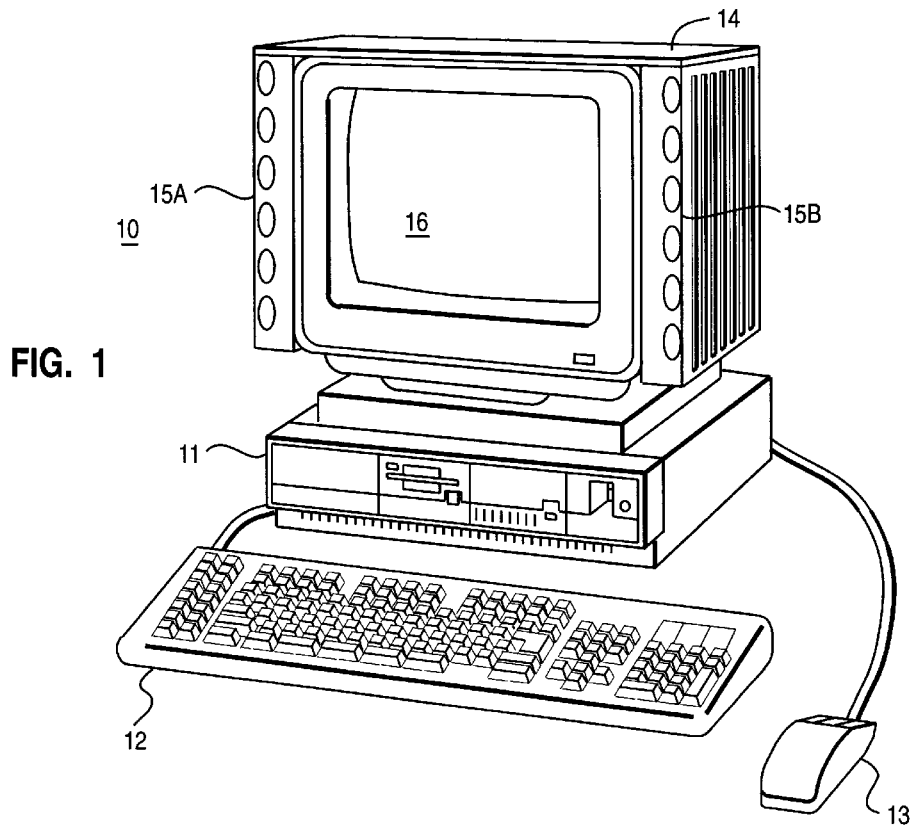
FIG. 1 is a representation of a multimedia personal computer system including the system unit, keyboard, mouse and multimedia display equipment with the speaker system of the present invention.

In FIG. 1, a personal computer 10, comprising a system unit 11, a keyboard 12, a mouse 13 and a display 14 are depicted. Also depicted are the speaker systems 15a and 15b mounted to the left and right of the monitor 14. The screen 16 of display device 14 is used to present the visual components multimedia presentation. The speaker system 15a and 15b provides good quality sound with very good impulse and phase response with good directionality for the single listener without disturbing others nearby. Note that the very thin shape of the speaker system requires a minimum of additional desk space beyond that which would ordinarily be required by the display 14 itself.

Figure 2:
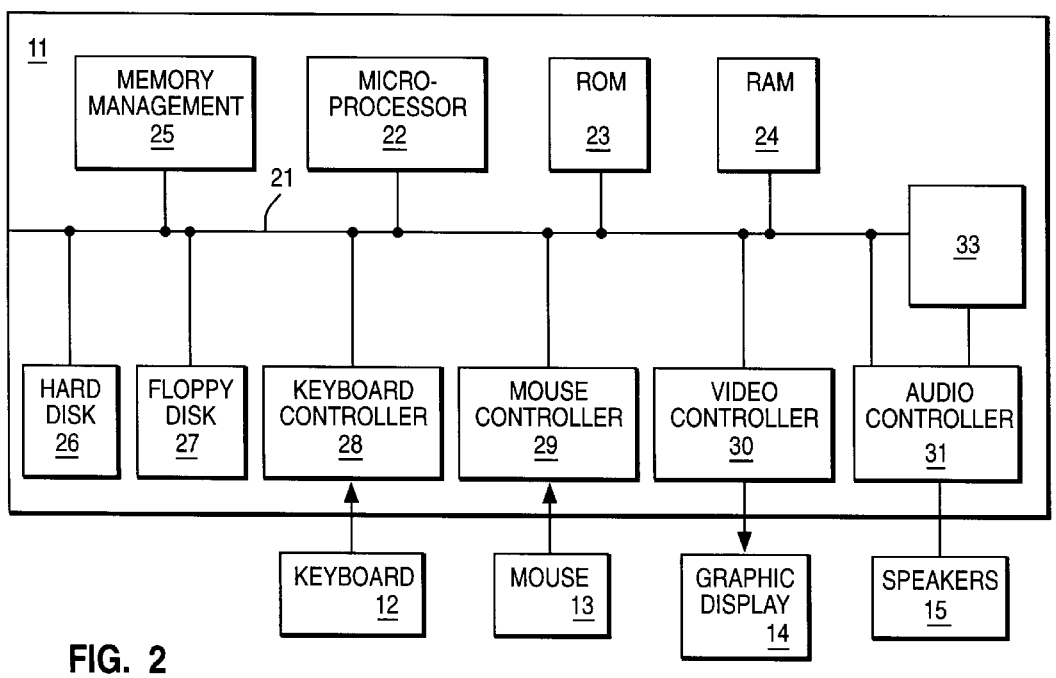
FIG. 2 is a block diagram of the multimedia computer system components on a preferred embodiment of the invention

FIG. 2 shows a block diagram of the components of the multimedia personal computer shown in FIG. 1. The system unit 11 includes a system bus to which various components are coupled and by which communication between the various components is accomplished. A microprocessor 22 is connected to the system bus 21 and is supported by read only memory (ROM) 23 and random access memory (RAM) and (24) also connected to system bus 21. A microprocessor in the IBM multimedia PS/2 series of computers is one of the Intel family of microprocessors including the 8088, 286, 386 or 486 microprocessors, however, other microprocessors included, but not limited to Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input/Output System (BIOS) which controls basic hardware operations such as the interaction and the disk drives and the keyboard. The RAM 24 is the main memory into which the operating system and multimedia application programs are loaded. The memory management chip 25 is connected to the system bus 21 and controls direct memory access operations including passing data between the RAM 24 and hard disk drive 21 and floppy disk drive 27. A CD ROM 28 also coupled to the system bus 21 is used to store the large amount of data present in a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Lastly, also coupled to the system bus is digital signal processor 33 which corrects the sound produced by the speaker system of the present invention to compensate for the speaker elements and is preferably in incorporated into the audio controller 31.

Figure 3A:
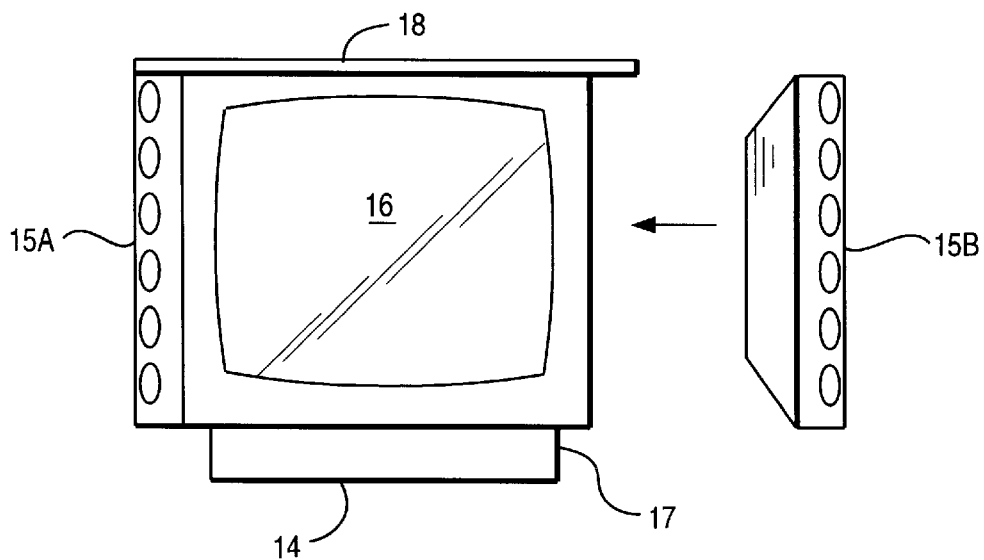
FIG. 3A is a front view of the computer display with the speaker system of the present invention.
Figure 3B:
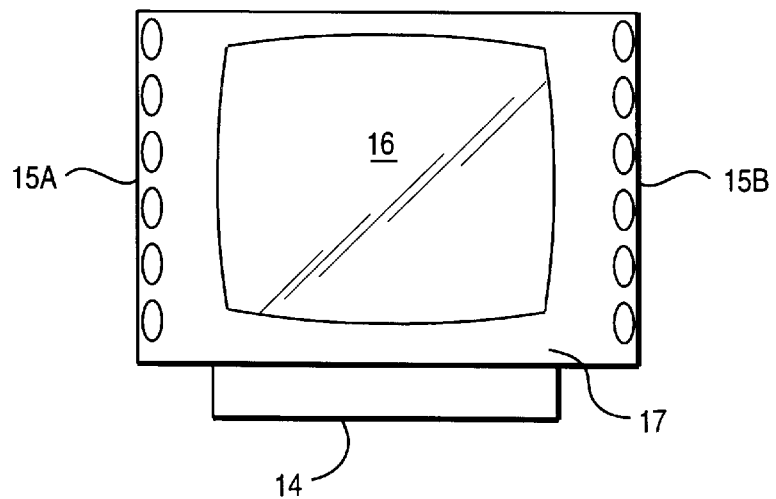
FIG. 3B is a front view of the computer display with the speakers incorporated in the bezel of the display.

FIG. 3 depicts a computer multimedia computer display 14 equipped with left and right speaker systems 15a and 15b of the present invention. Each speaker system is mounted on the display 14 on a surface of the display adjacent to the viewing surface 16 to provide stereo sound with good impulse and phase response and directionality for signal user seated in front of the display 14. Because the user will be seated directly in front of the display 14, rather than unpredictably about the room, a speaker system can take advantage of this known location to provide earphone-like quality without disturbing others nearby. Note that right speaker system 15b is shown detached from the computer monitor 14. This is to indicate that the speaker system may be packaged as a discrete unit to be attached to the computer display 14 once the user or systems integrator has decided that this particular personal computer will serve multimedia functions. The speakers may attach to the sides of the monitor by double-sided tape adhesive or other means such as loop and hook fasteners provided with the speaker system, or hang from a crossbar 18 laying across the top of the monitor similar to the headband of earphones. Alternatively, the speaker system may be incorporated into the bezel 17 of the computer display as shown in FIG. 3B.

FIGS. 4a and 4b show a detailed view front and side respectively of right speaker system 15b. In this embodiment, six small speakers 50 are mounted in the front face 51 of the speaker system, the speakers should be very small, approximately 1–2" in diameter. There are several reasons why a small speaker size is advantageous in the current invention. First, when mounted for stereo sound on the multimedia display monitor 14, the miniature speakers in the side panels 15a, 15b minimize the added width required by the multimedia display on a desktop. Second, a speaker size less than half a wavelength eliminates standing waves across the speaker cone, producing better phase linearity and smoother frequency response. The speaker response is less ragged, even though it may roll off at lower frequencies. Roll offs are easy to correct; ragged response is nearly impossible to correct. Third, a speaker will give more uniform dispersion for all frequencies for which the wavelength is greater than about twice the speaker size. Uniform dispersion means the speaker response can be corrected electronically, and acoustically by the rear baffle, with a correction which will be valid for a wide range of angles in front of the speaker. Fourth, a small speaker size enables the "sonic mouse" acoustic ranging technique described in the IBM Technical Disclosure Bulletin, "Virtual Integrated Mouse" by A. D. Edgar et al., March 1988, p. 398–401 which is hereby incorporated by reference.

The sonic mouse is a mechanism for controlling cursor position on the screen. At least one speaker in each array emits sound energy. Either the emitting speakers or at least one other speaker in the array act as microphones to receive; the reflected sound from the hand of a user in front of the display. The circuitry supporting the speaker system will measure the time delay to determine the distance of the user's hand from the speaker With at least two sets of distances, the use of triangulation techniques locates the hand position in the x-y plane. A third input from a third speaker/microphoner pair is used to locate the hand in the Z dimension. Each speaker must either transmit a unique frequency or at interleaved times to distinguish between speakers. As the user's hand moves, the cursor will move in response, allowing the user to point to the item in the graphical user interface to be selected. Also as described below, the sonic mouse also allows the computer system to locate the user in front of the display for very accurate stereo effects such as sonic holography.

Figure 4C:
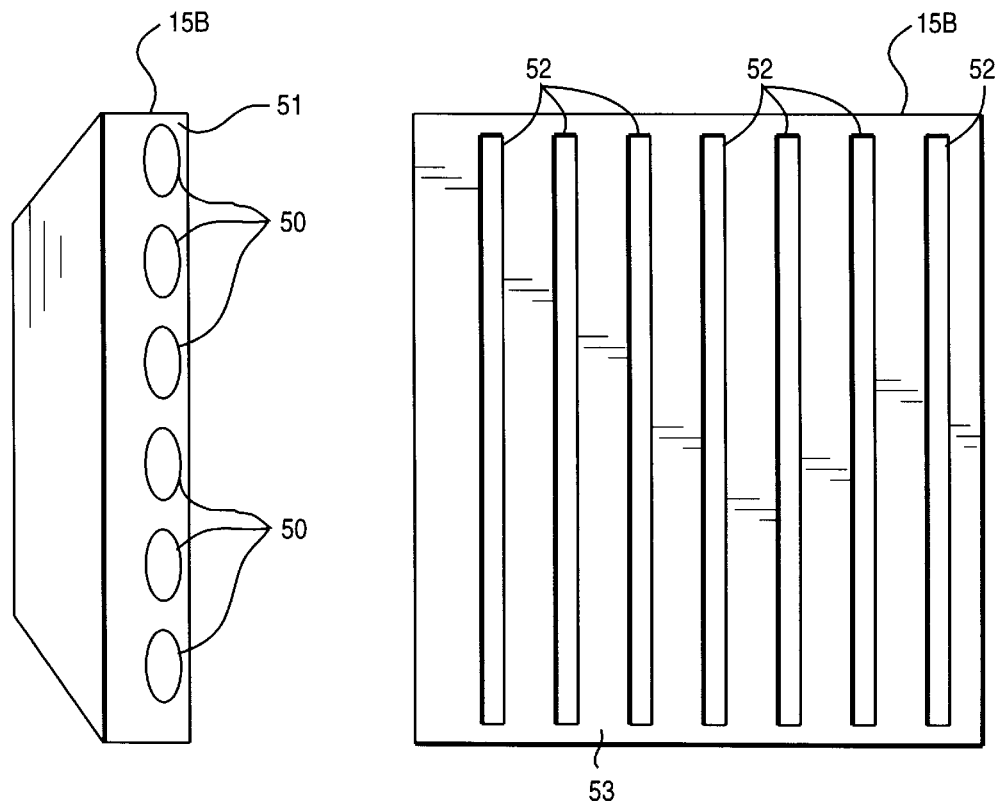
FIG. 4C depicts the process for locating or triangulating a user seated in front of the computer display.
Figure 4C:
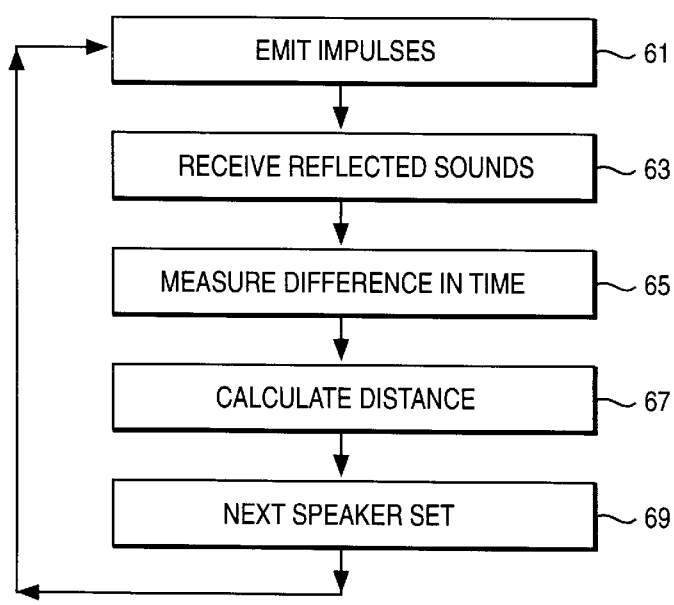

The sonic mouse can work with a single transmitter and multiple receivers. However, the position uncertainty caused by the time measurement deviations doubles using versus two transmitters. With a single transmitter, as compared to an interleaved pair of transmitters, the number of measurements can be doubled, reducing the error by averaging. Referring to FIG. 4C, the method of locating a user is depicted. All the speakers in the speaker system could be involved in the sonic mouse operation, first transmitting an impulse from the topmost pair, step 61, and receiving the reflected sound, step 63, measuring the difference in time between transmitting the impulse and receiving the reflected sound, step 65, calculating the distances from this time difference, step 67, to locate the user by triangulation. The process repeats, step 69, by next transmitting an impulse from the second topmost pair and receiving the reflected sound and so forth. Thus, measurements from a variety of spatial positions can be rapidly accumulated, increasing the measurement accuracy, much like a bat in flight.

By aligning many small speakers in a linear array and driving them with the same electrical signal, the linear array becomes a phased array, beaming the sound in the chosen plane perpendicular to array while sending less sound in other directions. The vertical orientation of the array disperses sound in horizontal angles around which the listener may move, while focusing sound away from going up or down, directions that the user is unlikely to move while using the display. For example, less sound is bounced off the hard desk under the display, the floor or the ceiling, reducing echo which would ordinarily muddy details. Even sitting close to a regular speaker in a small office, over half the sound energy is heard from room reverberations. Beaming the sound in the horizontal plane of the listener with the speaker system of the present invention creates an earphone-like distinctness while reducing the interference for others in the room by reducing energy radiated above or below the listener. The energy of a line radiator at close distances falls inversely with distance rather than inversely with a square of distance as with a point source, thus, when working close to the display there is better volume consistency with respect to distance by using many small speakers as opposed to a single larger speaker.

In addition, there is advantage in the power available from this speaker system. The power available from a phased array with each element receiving the same signal is proportional to the square of number of drivers; six times the speakers give 36 times the power. This overcomes the power limitations of using miniature speakers and thereby enables their advantages. This power boost works at frequencies for which all speakers appear equidistant to within a quarter wave from the listener, including bass frequencies for which small speakers need the boost. This is because the acoustic pressures from each speaker add if they are in phase, and power is proportional to the square of the acoustic pressure. Conservation of energy is preserved as each speaker is moving against the pressure of other speakers at low frequencies, thus providing a more efficient impedance coupling of mechanical energy into the air. At higher frequencies, the power gain at the listening position arises from the focusing of sound at the listener and away from other directions.

As shown in FIG. 4b, the side of speaker system 15b has a plurality of ports 52 to improve the directionally of the speaker system. As the positive wave emerging from the front of the speaker propagates in all directions, that portion moving to the rear runs in parallel with the negative wave emerging from the rear of the speaker propagating through the waveguide. The ports let the two parallel waves intermingle, thereby cancelling the nearward moving wave over the length of the waveguide. FIGS. 4a and 4b show 6 speakers and 7 slots in the speaker system, however, this number is variable and due to the design criteria for a particular speaker system.

The total acoustic power available from the system is proportional to the square of the total speaker surface area. Thus, normally, it is desirable to fit as many speakers into the line as will fit. An electric impedance problem may arise if all speakers are connected in series or parallel, therefore, a non-prime number of speakers allows more impedance connection flexibility while driving all speakers with the same signal. Also, the speaker arrays should have at least four speakers to obtain a phased array. Fewer than four speakers will not adequately create a line radiator and thus greatly reduce the superior sound characteristics taught by this invention.

The material chosen for the speaker cabinets and waveguide should be rigid so that no vibration is added to the audio sound. Internal struts may be used to help maintain rigidity of the speaker cabinets.

The preferable height and depth of the speaker systems are approximately 11"–14" to provide a good match for the sides of the monitor, although different sized monitors could accommodate larger or smaller speaker systems as appropriate. Further, there is no requirement that the height of the speaker array and the height of the display exactly match. For an array cabinet of 11 inches, ten one inch speakers, eight 1¼ inch speakers or six 1¾ inch speakers would fit. For an array cabinet of 14 inches, 14 one inch speakers or 6 two inch speakers would fit. The width of the speaker cabinets would be adjusted to a minimum width which would accommodate the speaker size.

Linear phase preserves the integrity of impulses. This is because with linear phase the group delay of all portions of an impulse are equal, thus preserving the "crispness" of sound of all frequencies. The effect of clean impulses is to avoid "muddiness" in the sound caused by blurring the time response of impulses, giving crisp sonic detail similar to that of good earphones. The small drivers make this possible by giving uniform frequency dispersion and therefore correctability over a range of listening angles. By correcting the impulse response, both the linear phase and a flat frequency response are obtained. If only the frequency response is corrected, a speaker system may still sound muddy or harsh.

Figure 5C:
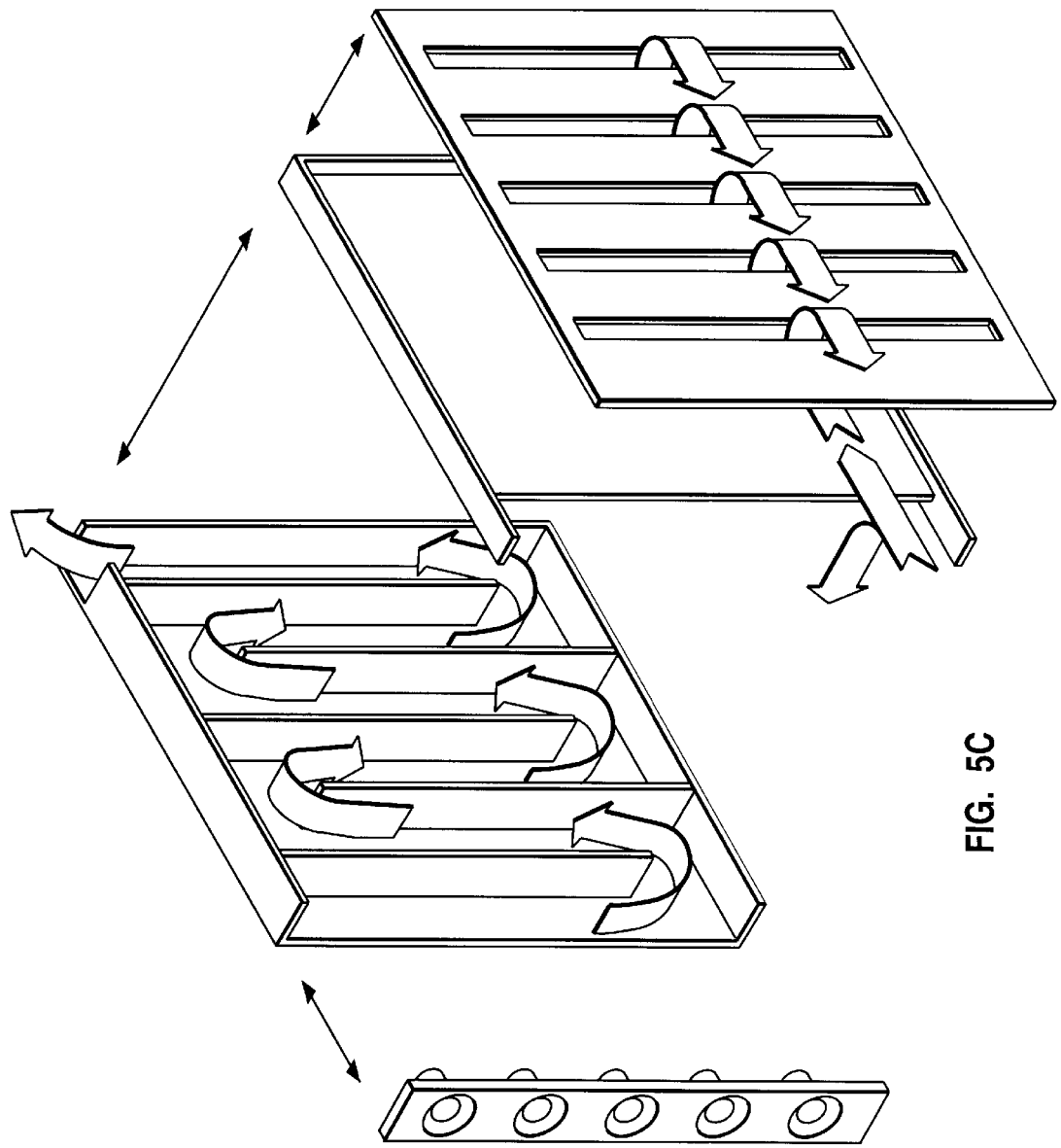

FIGS. 5a and 5b show cross-sectional views of the side and top of speaker system 15b respectively. FIG. 5C is a three dimensional view of the speaker system. FIGS. 5a–5c 5b show that the waveguide is separated into two sections, a treble sheet 60 which has the directional slots 52 and a bass sheet 65 which includes a variable impedance waveguide 55 which is coupled to the rear of the speakers in mixing area 56 and ends in port 57. The miniature speakers with their greater rigidity match this miniature waveguide better than a larger speaker. Varying the size of the waveguide baffle tube 55 varies its impedance. By decreasing the cross-sectional size at a distance "D" from the back of the speakers, a positive wave is reflected at the point of size transition. An increase in cross-sectional area has the reverse effect. The wave arrives back at the speaker in a little over two milliseconds, per foot of one way travel to the transition and in a phase cancelling the original impulse direction. This technique can be used to cancel a delayed spike in the speakers' impulse response. By contouring the width of the waveguide 55 throughout its length, much of the frequency response raggedness of the speaker can be accousto-mechanically corrected. The optimum shape of the maze can be found iteratively by experimentation, however, an approximation can be found from the speaker impulse response. As sound will travel one foot of maze length in approximately 2 milliseconds, the cross-sectional area of the waveguide is made proportional to the integral of the negative of the speaker impulse response following the initial desired sound impulse. Thus, if the impulse response has a positive spike at time=2 msec, then at distance=1 foot, the cross-sectional area should become abruptly smaller following a step function, the integral of the negative of the undesired spike. The smaller area reflects the negative pressure from the back of the forward driving speaker. This negative pressure arrives back at the speaker cone at the right time to pull the speaker back, cancelling the positive spike from the front.

To preserve reasonable bass response, the waveguide should hold at least 5 milliseconds of sound before opening to the air at port 57. This provides a peak around 100 hertz. A longer guide waveguide 55 can in fact be folded into any desired maze. It does not need to be configured as five feet of folded straight segments as illustrated in FIG. 5a.

With most loudspeakers, the precise phase and amplitude correction of the signal feeding the speaker for one listening angle actually makes the sound worse for an adjacent location for which the phase response is entirely different. The uniform horizontal dispersal in the listening plane of small speakers in a line array enables electronic correction of speaker response in the present invention.

In conjunction with, or separate from, the acoustic correction described above, the speaker impulse response can also be corrected electronically. By performing correction in the computer's digital signal processor, it can be interleaved into other sound processing that the computer is performing. Thus, the use of miniature speakers not only gives good uncorrected response, but by making the phase linearity the same over a wide listening angle, any disturbances are correctable electronically before the signal reaches the speaker.

Figure 6:
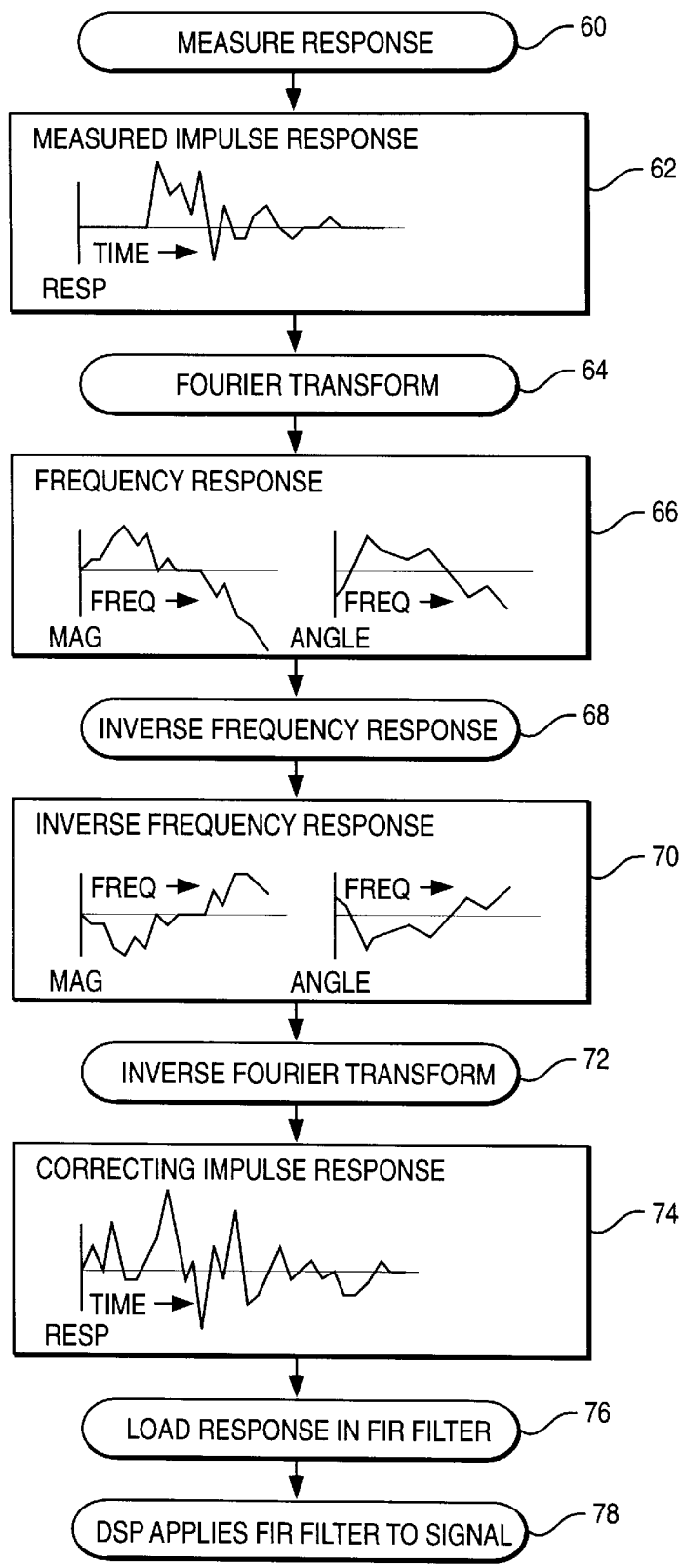
FIG. 6 depicts digital signal processor correction of phase roll offset for lower frequencies.

FIG. 6 shows a digital signal processor correction of a sound wave produced by the speaker of the present invention. In step 60, the response of the uncorrected speaker system is measured by exciting the speakers with an impulse response that is a single spike in time. The measurement of the speakers would be performed at the factory to save the cost of a moveable precision microphone and related circuitry, but recalibration could be performed at any time. The actual sound pressure measured as a function of time with a corrected microphone is the measured impulse response of the speaker system. It will be zero until some initial time, then will fluctuate. The fluctuations will diminish with time until they may be considered unimportant beyond a certain arbitrary final time. The measured impulse response is depicted in box 62.

With conventional speaker systems, this impulse response varies with even small changes in listening position, and thus is uncorrectable in practice. The use of very small speakers, combined with the line phased array topology of the speaker system of this invention, makes impulse response less dependent on angle without losing speaker efficiency. In the invention, the impulse response invariance with angle is critical to allowing electronic correction. Next in step 64, the frequency response of this impulse response is taken by applying a Fourier transform. Frequency response can be represented as a magnitude and a phase angle as a function of frequency. The frequency response is depicted in box 66.

The inverse frequency response, which will effectively undo the effects of the speaker system and is essentially the opposite of the system frequency response, is taken in step 68. Let M=frequency response magnitude and A=frequency response angle. Then $M'=1/M$ and $A'=-A$, where $M'$ and $A'$ are the inverse frequency response magnitude and phase angle. As a refinement, the gain of $M'$ is limited to prevent noise and distortion as M approaches zero. The inverse frequency is depicted in box 70. The inverse Fourier transform of this inverse impulse is taken in step 72 to produce the correcting impulse response. The width of this impulse typically extends to infinity in both directions, however, it may be truncated at selected points beyond which it may be considered unimportant. The span of the untruncated response is called the "window width" in the art of digital signal processing.

The resulting correcting impulse response (box 74) is loaded into a Finite Impulse Response (FIR) filter algorithm in the DSP in step 76. The DSP applies this filter to the signal in step 78 before it is applied to the speaker system, thereby precorrecting for frequency distortions in the speaker system.

More information on the subject of digital signal processing, including Fourier transforms, windows, and FIR filter algorithms may be found in *Digital Signal Processing* by Alan V. Oppenheim and Ronald W. Schafer, Prentice Hall, 1975.

Stereo techniques to affect the subjective spatial position of audio signals, despite the fact that the actual sounds emanate from loud speakers at fixed locations, are known to the art. The two major cues which are used to identify the direction or incidence angle of a sound source are the interaural intensity difference and the internal time delay. The internal intensity difference is the difference in loudness between the left and right channels; the interaural time delay is the difference between the left and right channels in the time a particular event is produced. Spectral cues also provide an important reference for sound direction. The reflection of sound off the convolutions of the pinnae (outer ear), the shoulders and the uppertorso impose directional information on the spectrum of the source signal. It has been suggested that spectral information should be added to the audio signal to add directional information. Sonic holography is described below. Two articles which discuss the spatialization of reproduced sound in detail are "Spatial Reverberation. Discussion and Demonstration" by G. S. Kendall et al. and "Spatialization of Sounds over Loudspeakers" by F. R. Moore both in *Current Directions in Computer Music Research*, 1989, MIT Press which are hereby incoporated by reference.

Existing stereo techniques as described above typically work best in a relatively small area or "sweet spot". Precision techniques such as sonic holography require nearly exact positioning of the listeners ears. In the preferred embodiment, the present invention takes advantage of the known position of the listener in proximity to the display for high quality sound. However, because of the ability of the speaker system to operate in sonic mouse mode, the exact location of the listener can be determined by the computer. Rather than measuring the position of the user's hand, in the sonic mouse mode, the speaker system can determine the position of the user's head for modification of the audio signal. Therefore, corrections to the interaural delay and intensity difference may be made if a user moves slightly near the display or even about the room.

By measuring the user's position, two arrays can be perfectly time delayed with each ear as the listener moves sideways. This keeps the center channel always perfectly focused on the center of the screen. Audio imaging techniques of sonic holography exist which strive to null the signal of the opposing ear by a time delayed inverse sound wave. Thus, the right ear hears only the right channel and the left ear can hear only the left channel. With the sonic mouse, the computer would be able to null the opposing ear no matter where the listener is. Interesting binaural functions such as making the sound seem to come from the ceiling or under the table are thus enabled.

Figure 7:
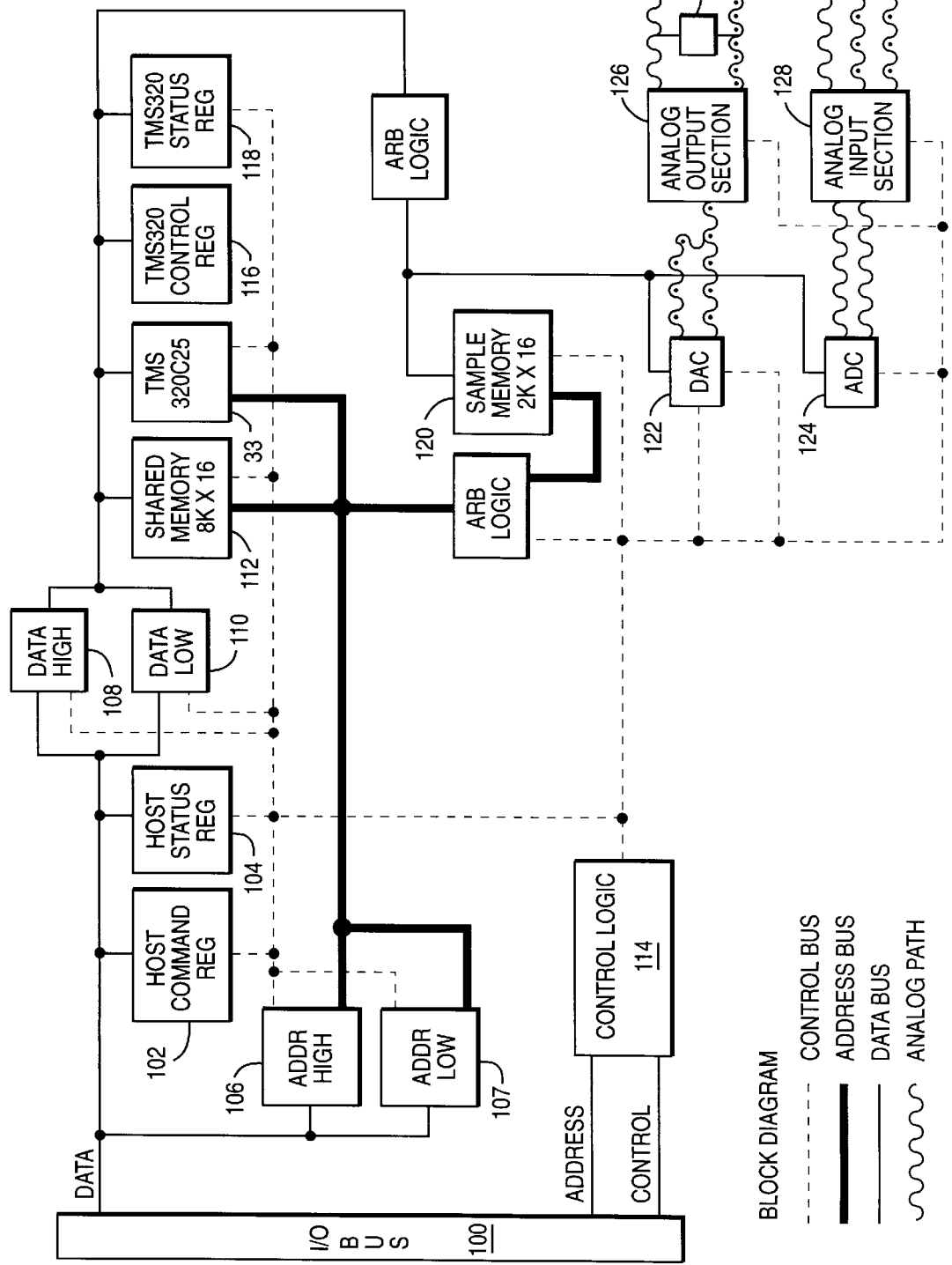
FIG. 7 depicts an audio controller card which can be used to control the speakers of the present invention.

FIG. 7 depicts the audio controller card which includes a digital signal processor (DSP) 33 for the correction of the speaker response. One possible audio controller is the M-Audio Capture and Playback Adapter announced and shipped on Sep. 18, 1990 by the IBM Corporation. Referring to FIG. 7, the I/O bus is a microchannel or PC I/O bus 100 which allows the Personal computer to pass information via the I/O bus 100 to the audio controller. A command register 102, a status register 104 and address high byte counter 106 and address low byte counter 107, a high data high byte bidirectional latch 108, and a data low bidirectional latch 110 are also included on the audio controller card. The registers are used by the personal computer to issue commands and monitor the status of the audio controller card. The address and data latches are used by the personal computer to access the shared memory 112, which is an 8K by 16 bit static RAM on the audio controller card. The shared memory 112 also provides a mean of communication between the personal computer and the digital signal processor 33.

A memory arbiter, part of the control logic 114, prevents the personal computer and the DSP 33 from accessing the shared memory 112 at the same time. The shared memory 112 can be divided so that part of the stored information is logic used to control the digital signal processor 33. The digital signal processor has its own control registers 116 and status registers 118 for issuing commands and monitoring the status of other parts of the audio controller card.

The audio controller card contains another block of RAM called the sample memory 120. The sample memory 120 is a 2K by 16 bit static RAM which the DSP 33 uses to store outgoing audio signals to be played on the speaker systems or store incoming signals of digitized audio. The sound impulses for the sonic mouse mode of the speaker system, both outgoing and incoming, are stored temporarily in the sample memory 120 for transfer to the personal computer for storage. The digital analog converter (DAC) 122 and the analog digital converter (ADC) 124, convert the audio signal between the digital environment of the computer and the analog sound produced or received by the speakers. The DAC 122 receives digital samples from the sample memory 120, converts the samples to analog signals and sends these signals to the analog output section 126. The analog output section 126 conditions and sends the digital signals provided by the personal computer to the output connectors for transmission via the speaker system. As the DAC 122 is multiplexed, continuous stereo operation can be given to both right and left speaker components.

The ADC 124 is the counterpart of the DAC 122. The ADC 124 receives analog signals from the analog input section 128 which receives the signals from the speaker system acting as a microphone or another audio input device such as a tape player. The ADC 124 converts the analog signals to digital, samples and stores them in the sample memory 120. The control logic 114 issues interrupts to the personal computer after the DSP 33 has issued an interrupt request.

Providing a stereo audio signal to the speaker system works in the following way. The personal computer informs the DSP 33 that the audio controller should play a particular sample of digitized sound data. In the subject invention, the personal computer gets the digital audio samples from its memory or disk storage and transfers them to the shared memory 112 through the I/O bus 100. The DSP 33 takes the samples and converts them to scaled values and places them in the sample memory 120. The DSP 33 then activates the DAC 122 which converts the digitized samples into audio signals, the audio output section 126 conditions the audio signals and places them on the output connectors.

To operate in sonic mouse mode, following manner. First, the personal computer sends the impulses used to locate the user to the shared memory 112 and the DSP 33 to be sent to the speakers in the speaker system which act as emulators. Then the personal computer informs the digital signal processor 33 through the I/O bus 100 that the audio controller card should digitize the reflected sound from the user's body. The DSP 33 uses its control registers 116 to enable the ADC 124. The ADC 124 digitizes the incoming audio signals and places the samples in the sample memory 120. The DSP 33 receives the signal from the sample memory 120 and transfers them to the shared memory 112. The DSP 33 then informs the personal computer via the I/O bus 100 that the digital samples are ready for the personal computer processor to read. The personal computer gets the samples over the I/O bus 100 and stores them in its RAM or disk storage. The difference in time between the emitted sound impulse and the reflected sound establishes the distance and location of the user from the display. Preferably, the sounds used for the sonic mouse are not in the human range of hearing so that the audio portion of the multimedia presentation may be interleaved with the sonic mouse function. The effect to the user is simultaneous sound and cursor positioning. Interleaving the stereo sound and the sonic mouse is particularly useful if the audio signals to the speaker system are to be altered according to the user's position.

While the invention has been described with respect to particular embodiments above, it would be understood by those skilled in the art that modifications may be made without departing from the spirit and scope of the present invention. The frequencies at which the sonic mouse may operate can be significantly higher than the human ear can hear. Digital audio signals, for example, end abruptly at the Nyquist limit, 22 kHz for and audio CD. Thus, the sonic mouse impulses can be added to the audio signal by the digital signal processor to allow concurrent use of the sonic mouse and sound production by the speaker system. These embodiments are purposes of example and illustration only and are not to be taken to limit the scope of the invention narrower than the scope of the appended claims.

I claim:

1. A method for dynamically correcting an audio signal of a speaker system in a listening environment, comprising the steps of:

sending a substantially identical audio signal to each of a plurality of small speakers arranged in a right and a left vertical linear speaker array producing a correction sound in the listening environment;

receiving the correction sound with at least one of the small speakers in the array;

calculating an electronic filter for the speaker system to correct speaker response according to the received correction sound; and intercepting and filtering the audio signal with a programmed processor according to the calculated electronic filter wherein a left audio signal sent to the left speaker array is selectively altered so that the sound produced by the left speaker array nulled at a right ear of the user and right audio signal sent to a the right speaker array is selectively altered so that sound produced by the right speaker array is nulled at left ear of the user;

wherein the electronic filter is periodically recalculated, thus dynamically correcting speaker response over time.

2. The method as recited in claim 1 wherein a digital signal processor is used to correct for speaker response by applying a Finite Impulse Response filter based on the received correction sound.

3. The method as recited in claim 1 wherein a folded waveguide is coupled to the rear of each speaker and comprises:
   a bass folded waveguide resembling a serpentine, wherein the serpentine narrows and widens at specific points to acoustically correct for speaker response; and
   a treble sheet having a plurality of slotted ports to increase directionality of sound from the speaker system.

4. The method as recited in claim 1 which further comprises the steps of:
   interleaving a locator signal with the audio signal and sending the interleaved signal to at least one of the small speakers in the array creating a locator sound;
   intercepting a reflected locator sound with a least one of the small speakers in the array;
   calculating a user's position with respect to the speakers based on the reflected locator sound; and
   altering the audio signal to optimize sound at the located position.

5. The method as recited in claim 4 wherein at least one speaker in each array is sent the interleaved locator signal.

6. The method as recited in claim 4 wherein the interleaved locator signal is significantly higher than the human ear can hear.

7. A speaker system for personal listening, wherein speaker response is dynamically corrected in a home listening environment comprising:
   a left and a right speaker unit each including a least four small speakers, arranged in a vertical linear sneaker array in a front face of each speaker unit, each speaker unit having a width dimension substantially smaller than a height dimension to minimize a total width of the speaker unit, each speaker in each respective speaker unit coupled to be driven with a substantially identical first electrical signal so that the speakers in each respective speaker unit become a phased array, wherein one of the small speakers functions as a transducer;
   means for sending a correction signal through the speaker units to produce a correction sound;
   means for receiving the correction sound by the transducer;
   means for calculating a filter for the speaker system to correct for speaker response according to the received correction sound;
   means for applying the filter to the audio signal;
   means for locating a user;
   means for selectively altering a left audio signal sent to the left speaker unit so that the sound produced by the left speaker array is nulled at a right ear of the user and a right audio signal sent to the right speaker unit so that sound produced by the right speaker array is nulled at left ear of the user;

a common folded waveguide in each speaker unit coupled to the rear faces of the plurality of speakers, the waveguide used predominantly for bass frequencies and having a width dimension substantially smaller than its height dimension or its depth dimension to minimize the width of the speaker system, the width dimension sufficient to accommodate a width dimension of the small speakers, the waveguide having a crosssection which is contoured along its length to correct for frequency response of the speaker system; and,
   a treble sheet oriented on a side face of each speaker unit having a plurality of slotted ports to increase directionality of sound from the speaker unit;
   wherein the calculated filter is periodically and dynamically recalculated in the home listening environment.

8. The speaker system as recited in claim 7 wherein the folded waveguide is decreased in cross section at a distance D1 from the rear face of the speakers to cancel a positive delayed spike in the speaker unit.

9. The speaker system as recited in claim 7 wherein the folded waveguide is increased in cross section at a distance D2 from the rear face of the speakers to cancel a negative delayed spike in the speaker unit.

10. The speaker system as recited in claim 7 wherein each speaker unit has a height dimension substantially equal to a height dimension of a computer display and the speaker system further comprises a means for mounting the speaker units to the display.

11. A computer display system equipped with a dynamically corrected speaker system comprising:
    a display having a front, viewing surface;
    a right and a left speaker unit respectively comprised of a right and a left plurality of small speakers, the right and left pluralities arranged in vertical linear arrays to the right and the left of the front surface of the display, each having a height dimension substantially equal to a height dimension of the display and a width dimension substantially smaller than its height dimension to minimize a total width of the display and the speaker units, each speaker in the right and left speaker unit coupled to receive a right or left electrical signal respectively so that the right and left vertical linear arrays become phased arrays, wherein at least one of the speakers functions as a transducer;
    means for sending a correction signal through the speaker units to produce a correction sound;
    means for receiving the correction sound by the transducer;
    computer processor means for calculating a filter for the speaker system to correct for speaker response according to the received correction sound;
    means for applying the calculated filter to the audio signal;
    means for locating a user;
    means for selectively altering a left audio signal sent to the left speaker unit so that the sound produced by the left speaker array is nulled at a right ear of the user and a right audio signal sent to the right speaker unit so that sound produced by the right speaker array is nulled at left ear of the user;
    wherein the calculated filter is periodically recalculated, thus dynamically correcting speaker response over time.

12. The system as recited in claim 11 wherein the bass folded waveguide is decreased in cross section at a distance D1 from the rear face of the speakers to cancel a positive delayed spike in the speaker unit.

13. The system as recited in claim 11 wherein a front face of each speaker in the right and left vertical linear arrays is incorporated in the bezel of the display.

14. The system as recited in claim 11 which further comprises:
   means for interleaving a locator signal with the audio signal and sending the interleaved signal to at least one of the small speakers in the array creating a locator sound;
   means for intercepting a reflected locator sound with a least one of the small speakers in the array;
   means for calculating a user's position with respect to the speakers based on the reflected locator sound; and
   means for altering the audio signal to optimize sound at the located position.

15. The system as recited in claim 11, wherein the computer processor means and an audio controller board is located on a programmed digital signal processor.

16. A speaker system for personal listening having both dynamic electronic correction and acoustic correction of speaker response comprising:
   a right and a left sneaker unit each including a least four small speakers, arranged in a vertical linear array, each speaker unit having a width dimension substantially smaller than a height dimension to minimize a total width of the speaker unit, each speaker in each respective speaker unit coupled to be driven with a substantially identical first electrical signal so that the speakers in each respective speaker unit become a phased array;
   wherein at least one of the speakers functions as a transducer;
   means for sending a correction signal through the speaker units to produce a correction sound;
   means for receiving the correction sound by the transducer;
   computer processor means for calculating a filter for the speaker system to correct for speaker response according to the received correction sound;
   means for applying the calculated filter to the audio signal;
   means for locating a user;
   means for selectively altering a left audio signal sent to the left speaker unit so that the sound produced by the left speaker array is nulled at a right ear of the user and a right audio signal sent to the right speaker unit so that sound produced by the right speaker array is nulled at left ear of the user; and
   a common folded waveguide in each speaker unit coupled to the rear faces of the plurality of speakers, the waveguide having a width dimension substantially smaller than its height dimension or its depth dimension to minimize the width of the speaker unit, the width dimension sufficient to accommodate a width dimension of the small speakers, the waveguide being decreased in cross section at a distance D1 from the rear face of the speakers to correct for frequency response of the speaker unit;
   wherein the speaker system is dynamically corrected by the transducer, sending, receiving, calculating and applying means in a listening environment and acoustically corrected by the contouring of the common folded waveguide.

* * * * *